United States Patent
Ryan et al.

(10) Patent No.: US 12,498,945 B2
(45) Date of Patent: Dec. 16, 2025

(54) AUTOMATION DISCOVERY PLATFORM

(71) Applicant: ServiceNow, Inc., Santa Clara, CA (US)

(72) Inventors: Patrick Ryan, Oklahoma City, OK (US); Aparna Mahalingam, Fremont, CA (US); Rammohan Narendula, San Jose, CA (US); Phani Nivarthi, Mountain House, CA (US)

(73) Assignee: ServiceNow, Inc., Santa Clara, CA (US)

( * ) Notice: Subject to any disclaimer, the term of this patent is extended or adjusted under 35 U.S.C. 154(b) by 245 days.

(21) Appl. No.: 18/368,407

(22) Filed: Sep. 14, 2023

(65) Prior Publication Data

US 2025/0094187 A1    Mar. 20, 2025

(51) Int. Cl.
*G06F 9/451*      (2018.01)
*G06F 40/40*      (2020.01)

(52) U.S. Cl.
CPC .............. *G06F 9/453* (2018.02); *G06F 40/40* (2020.01)

(58) Field of Classification Search
CPC ................................ G06F 9/453; G06F 40/40
See application file for complete search history.

(56) References Cited

U.S. PATENT DOCUMENTS

| | | | |
|---|---|---|---|
| 8,504,408 B2 | 8/2013 | Banthia | |
| 10,846,617 B2 | 11/2020 | Burhanuddin | |
| 11,087,094 B2 * | 8/2021 | Chatterjee | G06N 5/022 |
| 11,200,886 B2 * | 12/2021 | Chatterjee | G10L 15/1822 |
| 11,392,840 B2 | 7/2022 | Santhanam | |
| 11,822,890 B2 * | 11/2023 | Kim | G06N 20/00 |
| 11,876,758 B1 * | 1/2024 | Mueller | H04L 51/02 |
| 12,003,668 B1 * | 6/2024 | Yeracaris | H04M 3/4933 |
| 2019/0042663 A1 * | 2/2019 | Gupta | G06F 40/40 |
| 2019/0130904 A1 * | 5/2019 | Homma | G06N 3/088 |
| 2020/0117336 A1 * | 4/2020 | Mani | F25B 49/005 |
| 2021/0014260 A1 * | 1/2021 | Singh | H04L 41/16 |
| 2021/0192412 A1 * | 6/2021 | Krishnaswamy | G06Q 10/06375 |
| 2021/0280195 A1 * | 9/2021 | Srinivasan | G06F 3/167 |
| 2023/0007124 A1 * | 1/2023 | Krucek | G10L 15/1815 |
| 2023/0245651 A1 * | 8/2023 | Wang | G06N 5/022 704/275 |
| 2023/0351257 A1 * | 11/2023 | Mourya | G06N 20/00 |
| 2024/0220732 A1 * | 7/2024 | Gupta | G06F 40/35 |

(Continued)

*Primary Examiner* — Tadesse Hailu
(74) *Attorney, Agent, or Firm* — McDonnell Boehnen Hulbert & Berghoff LLP

(57) ABSTRACT

In various embodiments, a process for providing an automation discovery platform includes obtaining training data indicating conversation utterances and labels that are associated with the conversation utterances, where each of the labels of at least a subset of the labels corresponds to a virtual agent automation topic. The process includes obtaining a language machine learning model, where the language machine learning model has been trained to a first trained state using unlabeled data. The process includes updating the language machine learning model from the first trained state to a second trained state by applying the training data to the language machine learning model, where updating the language machine learning model includes generating an automation discovery model configured to provide outputs corresponding to virtual agent automation opportunities.

22 Claims, 8 Drawing Sheets

(56) References Cited

U.S. PATENT DOCUMENTS

2024/0249081 A1\* 7/2024 UzZaman ............... G06F 40/40
2025/0068857 A1\* 2/2025 Lakshmikanthan .... G06F 40/30
2025/0086398 A1\* 3/2025 Yang ...................... G06N 20/00

\* cited by examiner

Incident 05/6/2022

🔗 Share Report

Report Range:
03/10/2014 – 04/29/2022

👥 Watchers

[ Related Reports ▼ ]

> Data Type: Incident  Fields: Short description  Total Records: 3275

Not Categorized (113)

Automation Opportunities (22)

We've clustered the remaining records that did not match with an existing automation opportunity.

| Cluster | Records ↓ | Example | Flagged ⓘ |
|---|---|---|---|
| > 1 | 503 | mkhsp2xdgpOS is DOWN | ☐ |
| > 2 | 199 | mktmp1ctxkp203 is DOWN | ☐ |
| v 3 | 144 | mkhsp2xdap02 – win_uptime_wmi – CRITICAL | ☐ |

⏱ MTTR
Mean time to resolve
2d 14h
MTTR is calculated based on closed records. 144 records in this group have state "closed."

Percentage by Priority
P4 – Low            37 (26%)
P3 – Moderate   34 (24%)
P2 – High           31 (22%)
P5 – Planning    25 (18%)
P1 – Critical      16 (11%)

Top Description Values
mkhsp2xdap02 – win_uptime_wmi – CRITICAL   18 (13%)
mkhsp2xdap01 – win_uptime_wmi – CRITICAL   10 (6.9%)
mkhsp2xdap03 – win_uptime_wmi – CRITICAL   10 (6.9%)
mkhsp2xdap09 – win_uptime_wmi – CRITICAL   10 (6.9%)
mkhsp2xdap12 – win_uptime_wmi – CRITICAL    9 (6.3%)

🔍 View Details

| | | | |
|---|---|---|---|
| > 4 | 120 | awtmntsimdb02 – mssql_cpu_busy – CRITICAL | ☐ |
| > 5 | 103 | awtmnSIIMCWEB01 is DOWN | ☐ |
| > 6 | 59 | mktmprctxlcm01 – win_uptime_wmi – CRITICAL | ☐ |
| > 7 | 57 | mktcp1obi01 – win_uptime_wmi – CRITICAL | ☐ |

FIG. 4B

AUTOMATION DISCOVERY PLATFORM

BACKGROUND OF THE INVENTION

A user may wish to make improvements to a computer application using machine learning tools, such as automating a workflow. However, it is difficult for a user to evaluate the effects or benefits of using a tool without first obtaining and deploying the tool. For example, to determine whether to adopt a tool, currently a user needs to engage in laborious manual analysis of the costs and benefits of using the tool.

BRIEF DESCRIPTION OF THE DRAWINGS

Various embodiments of the invention are disclosed in the following detailed description and the accompanying drawings.

FIG. 4B shows an example of a discovery report for an automation discovery platform including uncategorized items.

DETAILED DESCRIPTION

Figure 1:
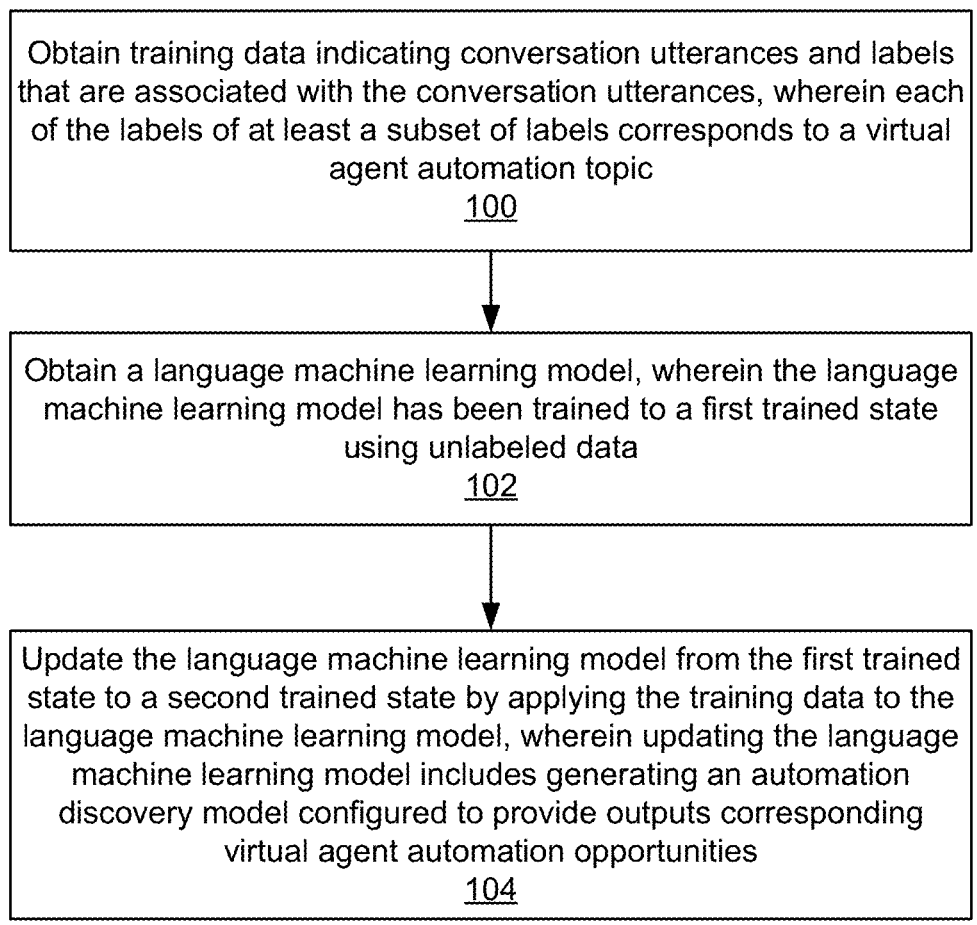
FIG. 1 is a flow diagram illustrating an embodiment of a process for providing an automation discovery platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for automation discovery includes analyzing customer data and recommending machine learning based tools/products to customers based on the analysis. The customer data may include application logs, chat conversations, incident tables, human resources (HR) case tables, and the like. The analysis is performed based on pretrained machine learning models that include one or more refined language machine learning models and clustering models. The refined language machine learning models are sometimes referred to as "updated" or "fine-tuned," because they perform better for specific user data compared with conventional machine learning models. For example, the models are applied on the customer data to classify and/or cluster the datapoints in the customer data. The classification results and/or clusters are used to generate reports that provide a quantitative assessment with benefits (e.g., return on investment) of using a particular machine learning based tool. The reports may include details such as machine learning based use cases that are specific to the customer data, a number of such use cases, an estimate of potential time savings associated with such use cases, and the like. For example, if the customer data includes incident information, then the process may include application of intent classification (using a refined language machine learning model), followed by intent clustering, and report generation to present the benefits of adopting a particular machine learning tool such as the number of hours that can be saved.

FIG. 1 is a flow diagram illustrating an embodiment of a process for providing an automation discovery platform. In some embodiments, the process of FIG. 1 is performed by automation discovery engine 220 of FIG. 2 or processor 602 of FIG. 6.

The process begins by obtaining training data indicating conversation utterances and labels that are associated with the conversation utterances, wherein each of the labels corresponds to a virtual agent automation topic (100). In various embodiments, the training data includes at least one of: an application log, a chat conversation, an incident table, or a human resources (HR) case tables.

Using the example of a virtual agent, this training dataset includes chat data. For example, while a user is interacting with the virtual agent, the user makes one or more utterances (spoken or written) regarding an incident, and this information is used for training. Each utterance is labeled to a natural language intent and/or a specific topic. For example, each natural language intent may be mapped to a specific virtual agent topic. At runtime, the trained model performs inference using an incident short description.

The type of training data may depend on the nature of the chat and the application for which a virtual agent is deployed. By way of non-limiting example, applications include: information technology operations (such as ITSM by ServiceNow), event/performance management (such as ITOM by ServiceNow), and human resources portals. For information technology operations, training data may include incidents and labels may include: a server not working, a server appears to be down, hardware requests, password resets, etc. For event/performance management, training data may include health log data and labels may include abnormal operating state. For HR, training data may include a case table, and labels may include: payroll, tax-related issues, onboarding, exit interviews, benefits (adding, removing, changing), immigration, etc.

One challenge is that there is typically limited training data, so conventionally machine learning models do not perform adequately at runtime (inference). In addition, the training data is different from the input received at runtime. For example, training data is chat data while runtime data is an incident record description. As further described herein, obtaining a language machine learning model and updating the language machine model allows good results to be obtained. That is, although the data on which automation discovery runs is different than the data on which the automation opportunities (recommended tools) are trained on, but the predictions are still accurate.

The process obtains a language machine learning model, wherein the language machine learning model has been trained to a first trained state using unlabeled data (102). The language machine learning (sometimes simply referred to as an LLM) is trained using unlabeled data. The language understanding model can be trained using publicly available data. Typically, a language understanding model has been trained with a large volume of data and would be able to identify information such as what is a ticket, whether a server is down, etc. The language understanding model can be updated (fine-tuned) using the training dataset referred to in 100 to be better able to predict topics of interest to a particular user. The first trained state of the language machine learning model refers to a state of the model prior to updating.

The process updates the language machine learning model from the first trained state to a second trained state by applying the training data to the language machine learning model, wherein updating the language machine learning model includes generating an automation discovery model configured to provide outputs corresponding to virtual agent automation opportunities (104).

The second trained state of the language machine learning model refers to a state of the model after updating. The disclosed techniques provide improved predictions even when the training data is limited. The training data (that was initially used to train the model) is used to fine tune the output of a language understanding model. A base LLM is trained using a large volume of data and then fine-tuned using the user-specific training data to identify topics relevant to the user's data. LLMs trained using generic data are able to generalize better than traditional models trained using training data specific to a user. The titles and the incident records are similar, but differ from chat (label) data. LLMs perform better than traditional models and make more accurate inferences using an incident short description because they have been trained on a large body of data.

By contrast, a conventional system that uses a classical classification model does not perform as well because of the limited amount of training data available. For every topic or intent, there are utterances and the model is trained on the utterances. However, the volume of chat data is typically small and the model does not have access to training data besides the chat data and possibly associated semantic information (e.g., embedded word(s)). Furthermore, at runtime, the model performs inference on an incident short description, which is different from the training data (utterances).

In various embodiments, the automation opportunity includes utilization of a machine learning based tool. For example, the process determines a quantitative assessment of using the machine learning based tool, where suggesting the automation opportunity includes providing the quantitative assessment. The automation opportunity may include at least one use case specific to a user, and a quantitative assessment of using the machine learning based tool includes potential time savings associated with the at least one use case.

Referring to the example of event/performance management, the process looks at the log data of the customers (e.g., real time), and predicts savings if they use various tools. In other words, the process determines, in a quantitative manner and given a user's particular data/situation, the potential savings associated with using each of various tools. For example, the processor predicts potential alerts, meaning the processor can foresee abnormal operation such as servers that could go down and prevent issues from happening. The potential savings may be presented as: there are X number of incidents based on your data, and they can automatically be handled by these VA topics.

Figure 2:
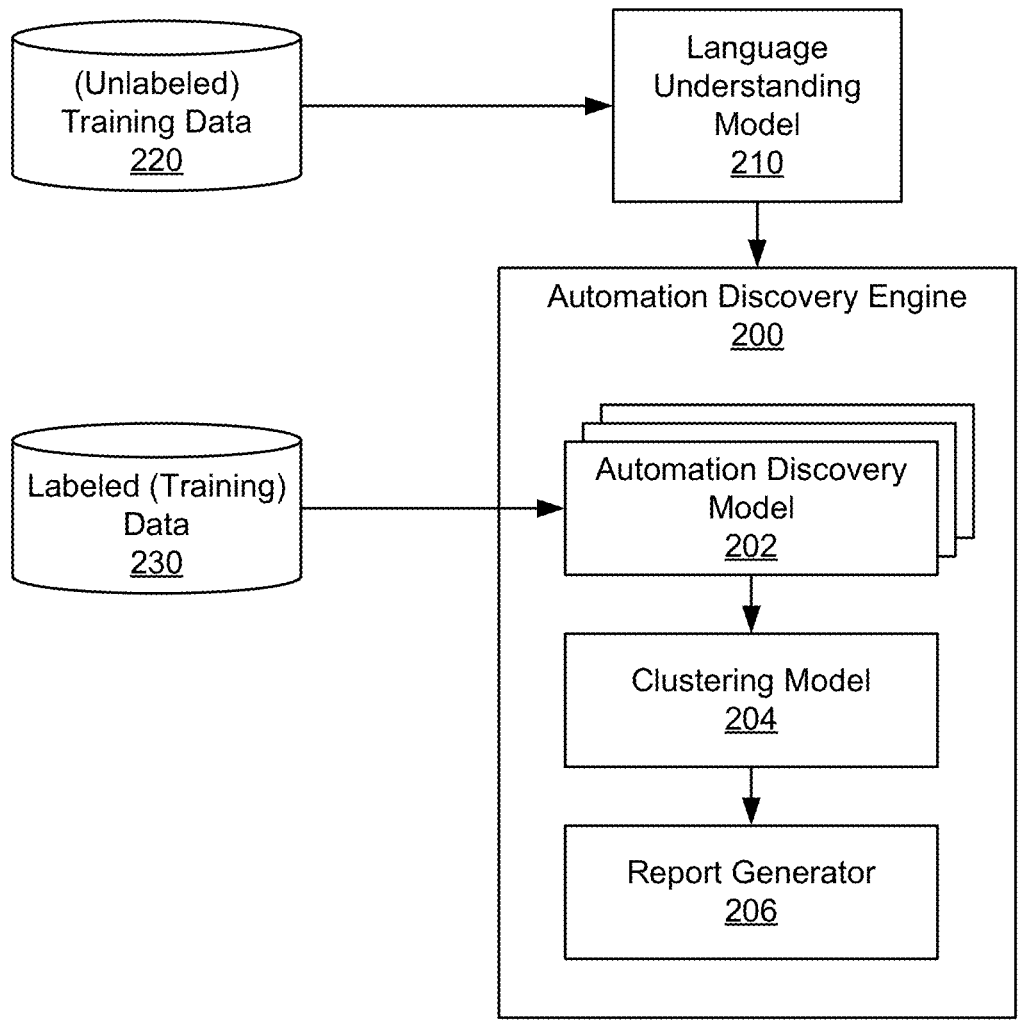
FIG. 2 is a block diagram illustrating an embodiment of a system for providing an automation discovery platform.

FIG. 2 is a block diagram illustrating an embodiment of a system for providing an automation discovery platform. The system includes an automation discovery engine 200, a language understanding model 210, and training data 220 and 230. Although shown as part of the system, in various embodiments, one or more of 210, 220, or 230 may be external to the system. For example, the automation discovery engine 200 may obtain a pre-trained language understanding model 210.

In various embodiments, the training data 220 is user-specific and includes data different from the unlabeled data 230 with which the language machine learning model 210 is trained.

The language understanding model 210 is trained using unlabeled data 230. An example of a language understanding model is RoBERTa or distilled RoBERTa. Another example of a language understanding model is GPT-3 or GPT-4. The language understanding model can be updated to generate one or more automation discovery models 202.

In various embodiments, the training data 230 is preprocessed, e.g., including by at least one of: cleaning the training data, applying de-duplication to the training data, measuring at least one statistic with respect to the training data, or removing small punctuation in the training data. The (pre-processed) training data is used to obtain the automation discovery model 202.

In various embodiments, language detection is performed on the training data. Referring briefly to FIG. 1, In various embodiments, the process performs language detection because the models are based on different languages. For example, one model is multilingual and another model is English. If English is detected, then the English model is used, otherwise the multilingual model is used.

In various embodiments, the system includes a plurality of automation discovery models 202. For example, referring briefly to FIG. 1, at 104, another automation discovery model is generated, where the automation discovery model is associated with a first automation opportunity and the other automation discovery model is associated with a second automation opportunity.

In various embodiments, a plurality of automation discovery models rather than a single global automation discovery model is used. Each model is trained to suggest a specific area of automation. Each model ingests user data and determines whether a tool is relevant or not. Each model is trained to consider use cases for a particular tool to determine how a user could benefit (or not) from that particular tool. In other words, the model determines the suitability of a particular for a particular user. A group of models can be adapted to make suggestions of tools/products provided by a platform such as ServiceNow, for example.

In various embodiments, data may be anonymized and shared among users (e.g., users of the same type) so that many users may benefit from improved models that have been trained with a body of data that includes data associated with more than one user (the data having been anonymized to remove privacy concerns).

In various embodiments, the process includes providing an incident description of an incident record to the automation discovery model, and suggesting an automation opportunity based on a result of the automation discovery model in response to the incident description. For example, at runtime (also called prediction or inference time), the model takes an incident record and outputs a predicted topic.

In various embodiments, the disclosed techniques are provided via a software application that may be made available through a store or online platform. Users may download the application, install it, and run the application, triggering processes such as the one shown in FIG. 1 to be executed to perform automation discovery. Alternatively, the features may be made available by integrating them into a platform that does not require the downloading of any application. Instead, users may be provided with graphical user interface embedded in a platform or workspace.

The following figures show some examples of graphical user interfaces associated with the automation discovery platform.

Figure 3:
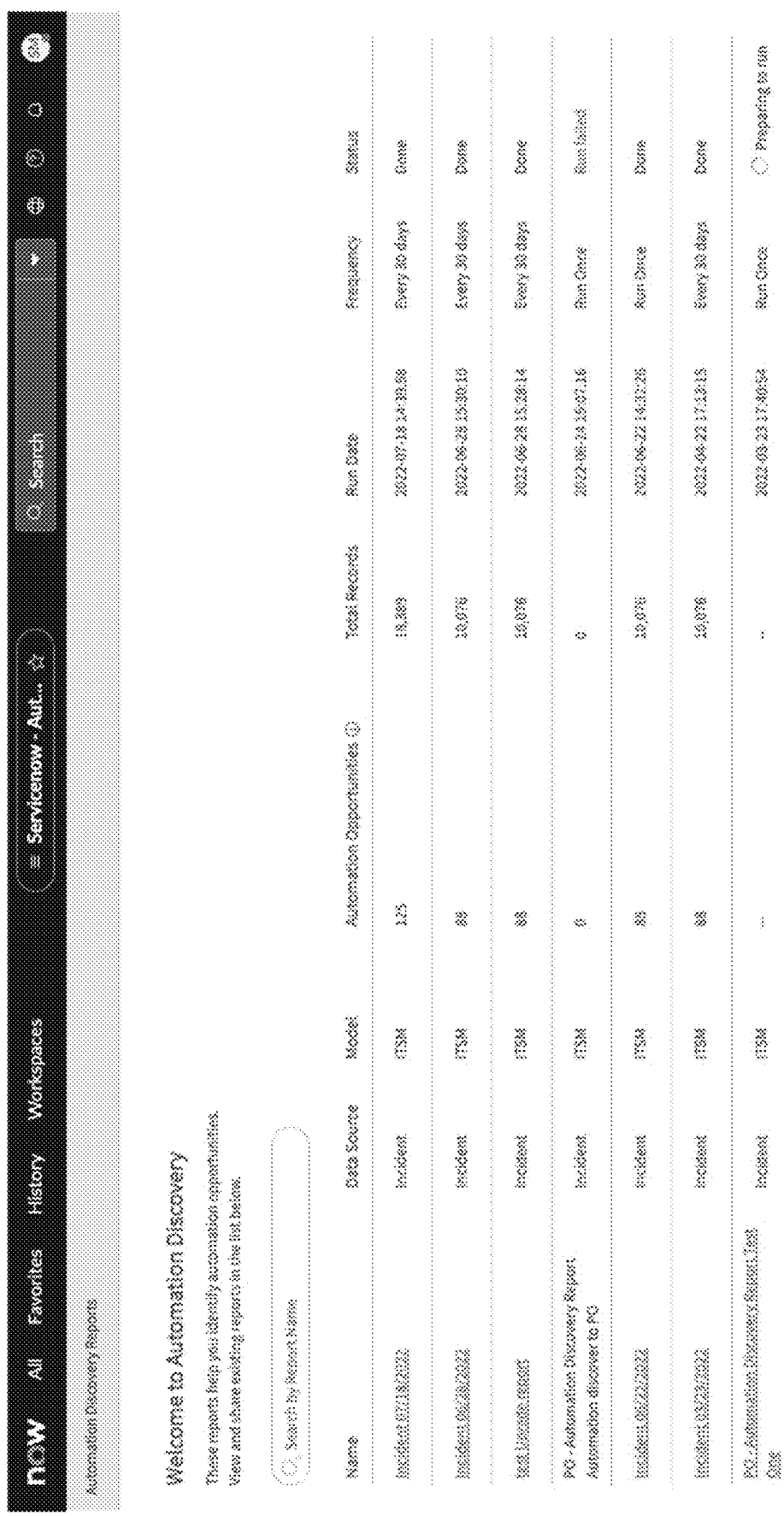
FIG. 3 shows an example of a graphical user interface for an automation discovery platform including a summary of discovery reports.

FIG. 3 shows an example of a graphical user interface for an automation discovery platform including a summary of discovery reports. In this example, each row corresponds to a separate incident and the automation opportunities associated with that particular incident. Selecting one of them will cause a discovery report to be displayed, an example of which is shown in the next figure.

Figure 4A:
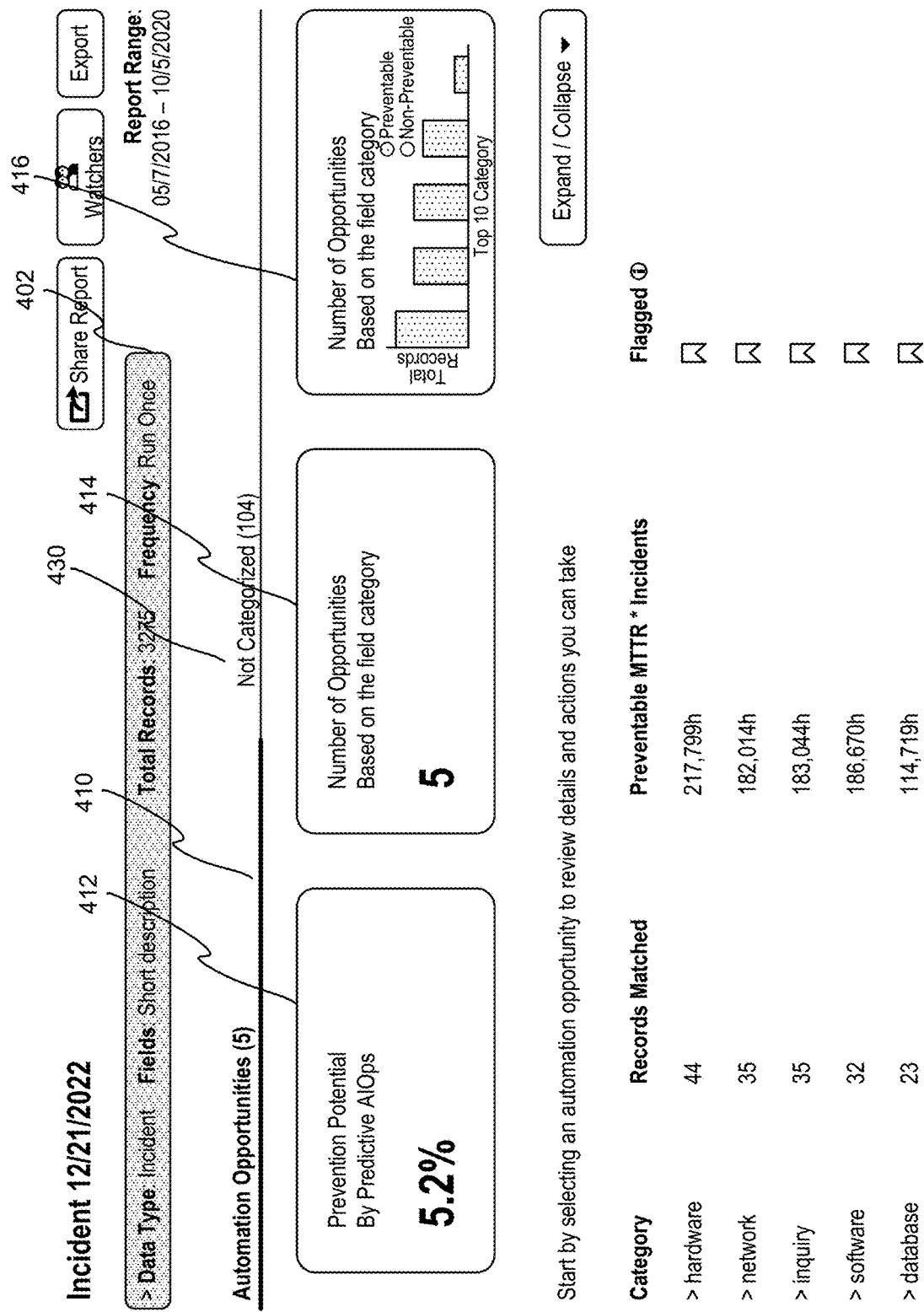
FIG. 4A shows an example of a discovery report for an automation discovery platform including automation opportunities.

FIG. 4A shows an example of a discovery report for an automation discovery platform including automation opportunities. This discovery report was generated on Dec. 21, 2022 from Incidents data. The report includes a summary 402 of the discovery report including the data type, fields, records, frequency, and date range of the report. The top of the report also includes buttons to share the report, see who is watching this report, and export the report.

Automation opportunities 410 and not categorized items 430 may be displayed. In this state, the automation opportunities are shown. 430 may be selected to display uncategorized items as further described herein. A summary of automation opportunities is displayed via three boxes. Box 412 shows the prevention potential by predictive AIOps (a machine learning based tool). Box 414 shows the number of opportunities based on the field category. Box 416 shows the number of opportunities in graph form.

Below the summary, automation opportunities are displayed by category. Each category is accompanied by matching records, preventable mean time to repair, and a flag enabling a user to flag the category and/or entries within the category. Further details of each category may be viewed by clicking on them. An example of a "maximized" category is shown in FIG. 5B.

The mean time to resolve (MTTR) refers to the average time to repair, resolve, recover, or otherwise restore components to an operational state, based on an average of all records. In various embodiments, MTTR is calculated using all the incidents that are classified. Referring to "hardware," there are 44 records, and the MTTR is obtained by summing the time to resolve for each record, and taking the average over all records.

For example, if there is an incident in a customer dataset, where the incident was raised a week ago and then it was resolved after three days. Then the MTTR is 3 days (72 hours) If there are 100 instances in a particular category, and on average they were resolved in three to five days then the MTTR is 4 days.

FIG. 4B shows an example of a discovery report for an automation discovery platform including uncategorized items. Sometimes there are uncategorized items (e.g., the process of FIG. 1 is unable to determine an intent or other category for the data), but this information can nevertheless be presented to a user in a meaningful way. Referring briefly to FIG. 1, the process identifies at least one cluster of data from a set of unclassified data, where the unclassified data are unclassified with respect to the outputs corresponding to virtual agent automation opportunities. The cluster(s) of data may be determined using a clustering model. The process may determine analytical information associated with the at least one cluster and provide the at least one cluster of data and the associated analytical information. The process may add another virtual agent automation topic based at least on the identified at least one cluster of data.

The identified clusters may be manually analyzed using the graphical user interface shown here. For example, the clusters are organized by size. Here, the first cluster has 503 records, the second cluster has 199 records, and so on. In this example, the third cluster has been expanded to view details. The example details here include (quantitative) analytical information such as the mean time to resolve, percentage by priority, and top description values.

In one aspect, this notifies the user that although this data was not mapped to available virtual agent topics (or other categories), they are nevertheless of interest, specifically by being a member of a particular cluster. In another aspect, if many similar (above a threshold number of) clusters appear across user, then a virtual agent topic can be added.

In various embodiments, automation discovery information such as insights and quantitative improvements is provided in the form of a report. The report may be interactive and/or historical data may be retained for a user. For example, a user may run the process to obtain an initial report and return later (e.g., 3 months later), and run the process again to generate a second report. The second report may highlight differences or improvements. This allows a user to see use trends and assess whether adopting or not using certain tools in the interim has changed performance.

Figure 5A:
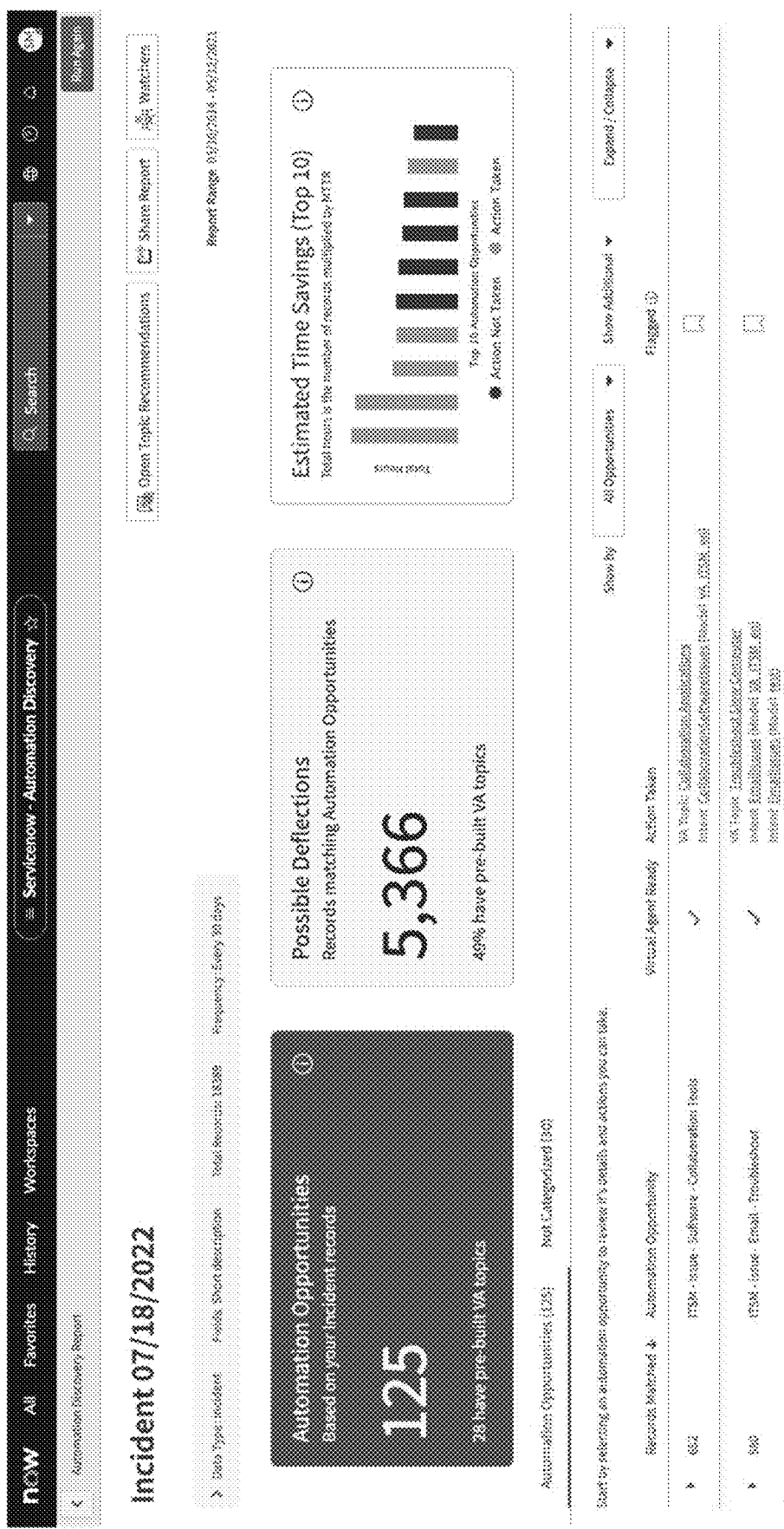
FIG. 5A shows an example of a discovery report for an automation discovery platform including automation opportunities.
Figure 5B:
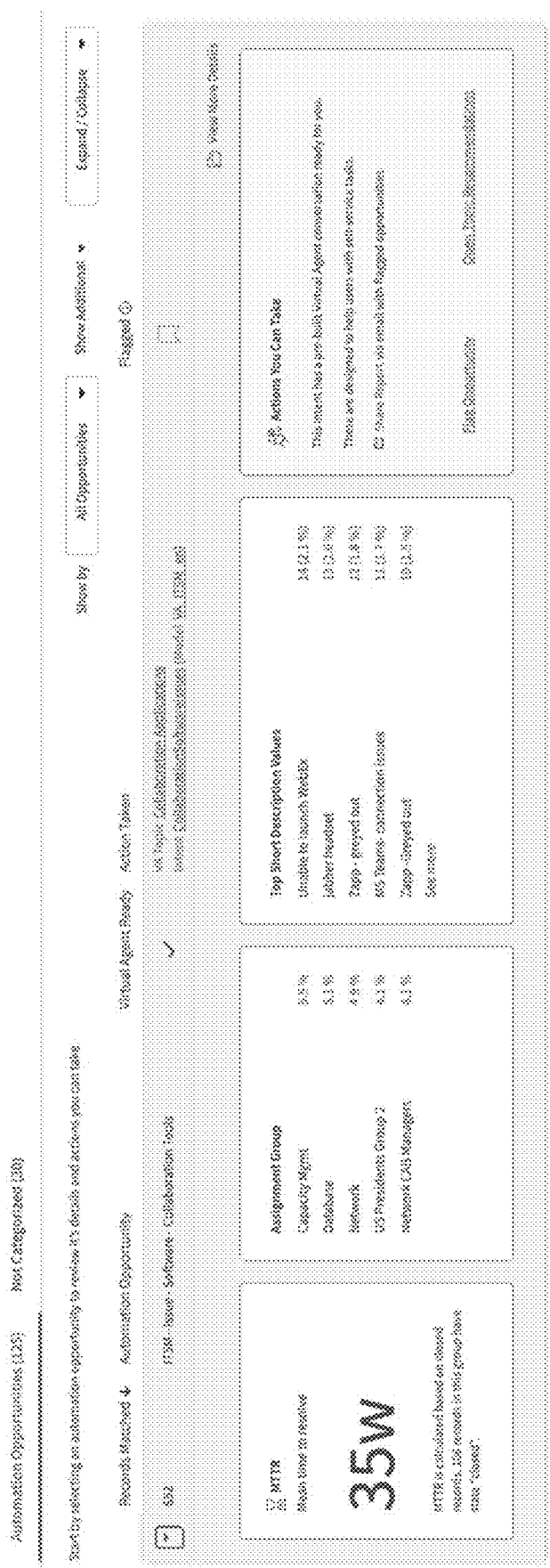
FIG. 5B shows an example of a discovery report for an automation discovery platform including automation opportunities.

FIG. 5A shows an example of a discovery report for an automation discovery platform including automation opportunities. Each of the components are like their counterparts in FIG. 4A.

FIG. 5B shows an example of a discovery report for an automation discovery platform including automation opportunities. Each of the components are like their counterparts in FIG. 4B.

Figure 6:
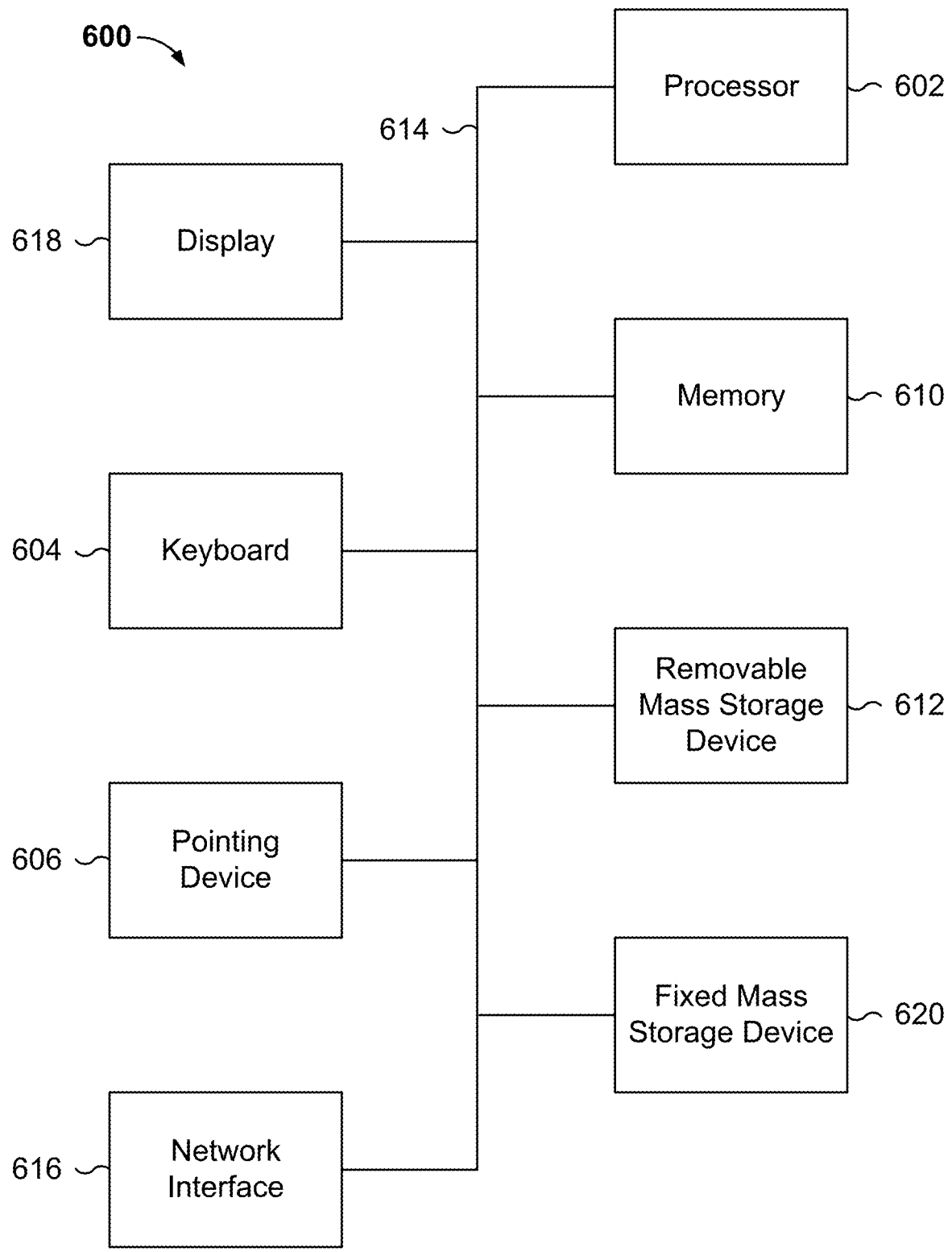
FIG. 6 is a functional diagram illustrating a programmed computer system for providing an automation discovery platform in accordance with some embodiments.

FIG. 6 is a functional diagram illustrating a programmed computer system for providing an automation discovery platform in accordance with some embodiments. As will be apparent, other computer system architectures and configurations can be used to providing an automation discovery platform. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide an automation discovery engine 220 described with respect to FIG. 2 and/or perform the process described below with respect to FIG. 1.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining training data indicating conversation utterances and labels that are associated with the conversation utterances, wherein each of the labels of at least a subset of the labels corresponds to a virtual agent automation topic;
   obtaining a language machine learning model, wherein the language machine learning model has been trained to a first trained state using unlabeled data;
   updating the language machine learning model from the first trained state to a second trained state by applying the training data to the language machine learning model, wherein updating the language machine learning model includes generating an automation discovery model configured to provide outputs corresponding to virtual agent automation opportunities;

providing an incident description of an incident record to the automation discovery model; and suggesting a virtual agent automation opportunity based on a result of the automation discovery model in response to the incident description.

2. The method of claim 1, wherein the training data indicating the conversation utterances and the labels that are associated with the conversation utterances include at least one of: an application log, a chat conversation, an incident table, or a human resources (HR) case table.

3. The method of claim 1, wherein the training data is user-specific and includes data different from the unlabeled data with which the language machine learning model is trained.

4. The method of claim 1, wherein at least one of the virtual agent automation opportunities includes utilization of a machine learning based tool.

5. The method of claim 4, further comprising determining a quantitative assessment of using the machine learning based tool, wherein suggesting the virtual agent automation opportunity includes providing the quantitative assessment.

6. The method of claim 5, wherein:
at least one of the virtual agent automation opportunities includes at least one use case specific to a user; and
the quantitative assessment of using the machine learning based tool includes potential time savings associated with the at least one use case.

7. The method of claim 1, wherein each of the labels corresponds to a natural language intent.

8. The method of claim 1, further comprising performing language detection on the training data.

9. The method of claim 1, further comprising generating another automation discovery model, wherein the automation discovery model is associated with a first virtual agent automation opportunity and the other automation discovery model is associated with a second virtual agent automation opportunity.

10. The method of claim 1, further comprising identifying at least one cluster of data from a set of unclassified data, wherein the unclassified data are unclassified with respect to the outputs corresponding to the virtual agent automation opportunities.

11. The method of claim 10, further comprising determining analytical information associated with the at least one cluster and providing the at least one cluster of data and the analytical information.

12. The method of claim 10, further comprising adding another virtual agent automation topic based at least on the at least one cluster of data.

13. The method of claim 1, further comprising pre-processing the training data by at least one of: cleaning the training data, applying de-duplication to the training data, measuring at least one statistic with respect to the training data, or removing small punctuation in the training data.

14. The method of claim 1, wherein at least one of the virtual agent automation opportunities is included in a discovery report.

15. The method of claim 14, wherein the discovery report includes a plurality of virtual agent automation opportunities.

16. The method of claim 14, wherein the discovery report is provided in a graphical user interface.

17. A computer program product embodied in a non-transitory computer readable medium and comprising computer instructions for:
obtaining training data indicating conversation utterances and labels that are associated with the conversation utterances, wherein each of the labels of at least a subset of the labels corresponds to a virtual agent automation topic;
obtaining a language machine learning model, wherein the language machine learning model has been trained to a first trained state using unlabeled data;
updating the language machine learning model from the first trained state to a second trained state by applying the training data to the language machine learning model, wherein updating the language machine learning model includes generating an automation discovery model configured to provide outputs corresponding to virtual agent automation opportunities; and
identifying at least one cluster of data from a set of unclassified data, wherein the unclassified data are unclassified with respect to the outputs corresponding to the virtual agent automation opportunities.

18. The computer program product of claim 17, further comprising:
determining analytical information associated with the at least one cluster and providing the at least one cluster of data and the analytical information.

19. The computer program product of claim 17, further comprising:
providing an incident description of an incident record to the automation discovery model; and
suggesting a virtual agent automation opportunity based on a result of the automation discovery model in response to the incident description.

20. A method comprising:
providing, to an automation discovery model, an incident description of an incident record, wherein a language machine learning model was trained to a first trained state using unlabeled data, wherein the language machine learning model was updated from the first trained state to a second trained state by applying labeled data to the language machine learning model, wherein data of the labeled data relate to conversation utterances, wherein labels of the labeled data relate to virtual agent automation topics associated with the conversation utterances, and wherein updating the language machine learning model includes generating the automation discovery model configured to provide outputs corresponding to virtual agent automation opportunities; and
receiving, from the automation discovery model, a suggestion of a virtual agent automation opportunity based on a result of the automation discovery model in response to the incident description.

21. The method of claim 20, wherein the labeled data includes data different from the unlabeled data.

22. The method of claim 20, wherein at least one of the virtual agent automation opportunities includes utilization of a machine learning based tool, and wherein suggesting the virtual agent automation opportunity includes providing a quantitative assessment of using the machine learning based tool.

* * * * *